March 11, 1958 — J. KEEFE, JR — 2,826,670

ELECTRICALLY HEATED LIQUID RECEPTACLES

Filed Aug. 8, 1956

INVENTOR
JACK KEEFE, JR.
BY B. P. Fishburne, Jr.
ATTORNEY

United States Patent Office 2,826,670
Patented Mar. 11, 1958

2,826,670

ELECTRICALLY HEATED LIQUID RECEPTACLES

Jack Keefe, Jr., St. Louis, Mo.

Application August 8, 1956, Serial No. 602,759

5 Claims. (Cl. 219—44)

The present invention relates to improvements in electrically heated liquid receptacles and the like.

An object of the invention is to provide in a coffee pot or like liquid heating receptacle a highly simplified and economical electrical heating element construction, which is also highly compact, rugged and durable.

A further important object is to provide a construction of the above-mentioned character enabling the use in a highly efficient manner of a readily available commercial type of electrical heating element.

A further object is to provide a liquid heating vessel having a one piece bottom which is formed about the heating element in a manner to provide a firm support for the same and to utilize a maximum surface area of contact between the one piece bottom and heating element to thereby render construction highly efficient from a thermal conductivity standpoint.

Another object is to provide a liquid heating vessel wherein the housed electrical heating element projects upwardly from the bottom of the vessel into the liquid zone for efficiently heating the liquid.

Other objects and advantages of the invention will be apparent during the course of the following description.

Figure 1:
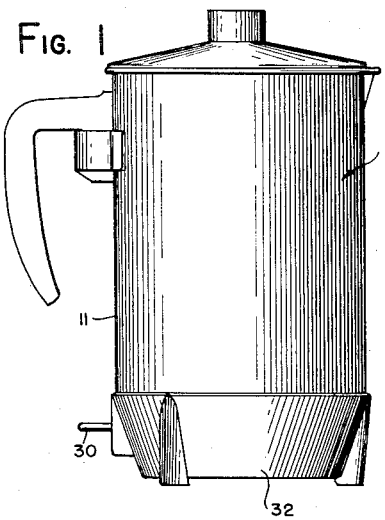
Figure 2:
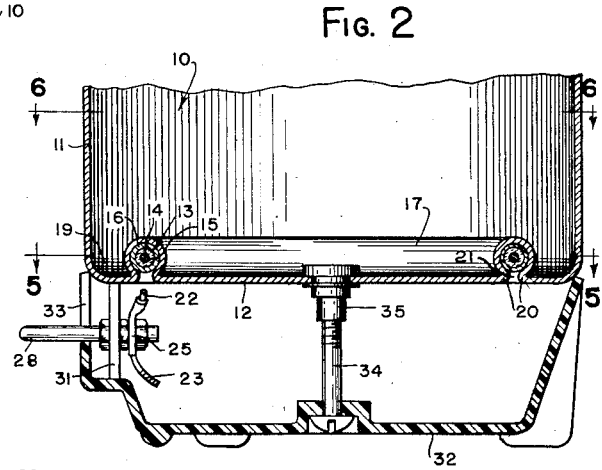
Figure 3:
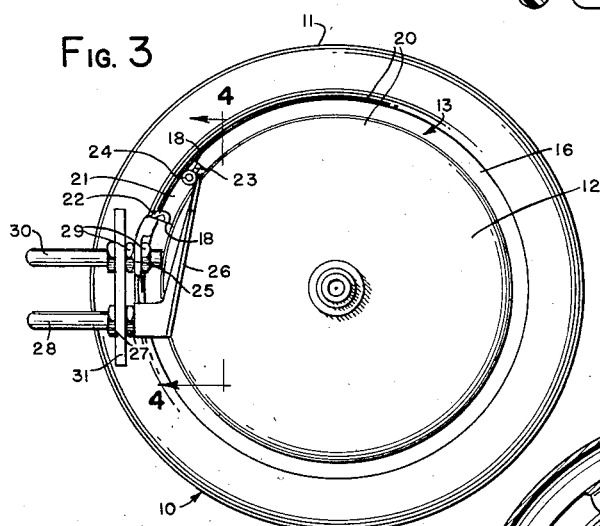
Figure 4:
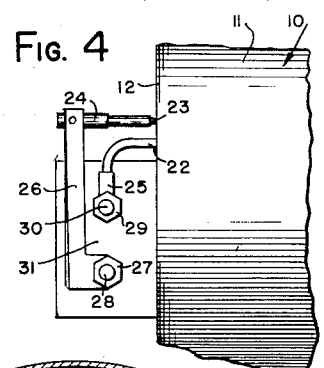
Figure 5:
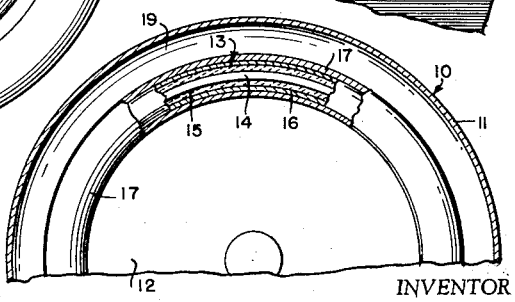
Figure 6:
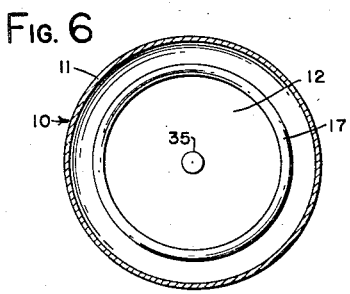

In the accompanying drawings forming a part of this application, and in which like numerals are employed to designate like parts throughout the same, Figure 1 is a side elevation of a liquid heating receptacle having the heating element construction in accordance with the invention, Figure 2 is an enlarged fragmentary central vertical section through the receptacle and showing the novel heating element construction and associated parts, Figure 3 is a bottom plan view of the receptacle with the plastic base thereof removed, Figure 4 is a fragmentary side elevational view taken on line 4—4 of Figure 3, Figure 5 is a fragmentary horizontal section taken on line 5—5 of Figure 2, with parts omitted and parts shown in elevation, Figure 6 is a horizontal section on a reduced scale taken on line 6—6 of Figure 2.

In the drawings, wherein for the purpose of illustration is shown a preferred embodiment of the invention, the numeral 10 designates generally the sheet metal shell or body portion of the receptacle, which is preferably of one piece or unitary construction and formed of relatively thin gage sheet aluminum or the like. The body portion 10 is cylindrical, as shown, and embodies a cylindrical side wall 11 and a circular generally flat one piece bottom 12, integral therewith, as shown.

An electrical resistance type of heating element 13 is provided, and this heating element is of conventional and well known construction in itself, and is readily available upon the market, for example, under the name "Calrod," as manufactured and sold by General Electric Company.

The heating element 13 generally comprises an internal current conducting resistance wire 14, an intermediate annular zone or layer 15 of electrical insulating and heat conducting material, and an outer tubular sheath or cover 16 of high heat conducting metal. The heating element 13 is circular in cross section, rod-like, and may be manufactured and purchased in various shapes and sizes. In the present application, the rod-like heating element 13 is circularly curved lengthwise, and forms almost a complete circle, as shown in Figure 3. The heating element 13 is quite strong or rigid radially of its outer sheath 16, and capable of withstanding relatively high compressive stresses without deforming.

In the present construction, bottom wall 12 of the shell 10 is formed by die means, not shown, almost entirely around the heating element 13, as shown in cross section, Figure 2. Actually, all but about sixty degrees of the cross sectional circumference of the heating element 13 is enclosed within the upstanding annular bead 17 formed in the bottom wall 12 by the drawing or stretching of the metal of the bottom wall over the heating element. The bead 17 is continuous or uninterrupted circumferentially of the shell 10, and extends for a full three hundred and sixty degrees, as best shown in Figure 6. As shown in Figure 3, and as previously mentioned, the heating element 13 is just short of forming a complete circle, and the ends of the outer sheath 16 are spaced apart a slight distance, as indicated at 18 in Figure 3. The bead 17 tightly engages about the heating element 13 and is likewise circularly curved in cross section and serves to bodily support the heating element and to anchor or fix the same relative to the shell 10. The bead 17 is in direct thermal contact with the heating element 13 throughout the entire length of the latter and around the major portion of its cross sectional circumference, as shown. The bead 17 and heating element 13 project above the bottom wall 12 so as to be disposed within the liquid holding zone of the shell 10, Figure 2. The bead 17 and heating element 13 are of somewhat smaller diameter than the cylindrical shell 10, so that an annular chamber 19 is formed between the side wall 11 and bead 17 at the bottom of the shell 10. It is desired to emphasize again that the bead 17 is uninterrupted circumferentially of the shell 10, and the entire bottom wall 12, including the bead 17 is of unitary or integral construction, and also integral with the side wall 11.

It is thus seen that the construction affords a rigid mounting for the heating element 13, and also places a maximum area of the bottom wall 12 in direct metal-to-metal thermal contact with the heating element 13, which is circular in cross section. The heating element construction, Figure 2, also materially stiffens the receptacle construction, which is an advantage. Chiefly, however, the advantage gained is that the construction enables the use in a most efficient manner and without the aid of separate fastener elements of an extremely efficient, long-lasting and readily available type of electrical heating element, instead of a number of less satisfactory types of heating elements, such as ribbon type elements or those formed from a continuous coil of resistance type wire or the like. A means has been provided for utilizing almost the entire cross sectional circumferential area of the particular heating element 13 by having the bead 17 drawn and permanently crimped around the same as shown in the drawings. As previously mentioned, there are no separate anchoring or fastener elements whatsoever for the heating element, and the same is anchored in place solely by the bead 17.

In the drawing of the bead 17 around and under the heating element 13, a pair of opposed closely spaced continuous annular shoulders 20 are formed upon the bottom wall 12 and under the heating element, and these shoulders 20 form between them, directly under the heating element, a downwardly opening continuous annular slot 21.

The portion of the slot 21 between the ends 18 of the sheath 16 is utilized for bringing out end portions 22 and 23 of the internal heating or resistance wire 14, Figure 3. These end wire portions 22 and 23 extend beyond the sheath ends 18 and into the slot portion 21 between the sheath ends and are then directed downwardly below the bottom wall 12, Figure 4. The wire ends 22 and 23 have terminal elements 24 and 25 fixedly secured thereto. The terminal 24 is additionally secured by soldering or the like to a conducting strip or jumper 26, the remote end of which is electrically connected at 27 with a first plug terminal 28. The other wire terminal 25 is electrically connected at 29 with a second plug terminal 30, the plug terminals 28 and 30 extending through openings in and being secured to and carried by a vertically disposed insulating plate 31 of porcelain or the like. The insulating plate 31, plug terminals 28 and 30 and associated parts are freely disposed below the bottom wall 12 and are bodily carried by the wire ends 22 and 23, which are quite stiff. The plate 31 is positioned near and inwardly of the cylindrical side wall 11 so that the prongs or terminals 28 and 30 will project radially therebeyond as shown in Figure 1.

The receptacle is provided with a suitable ornamental supporting plastic base 32, which houses and conceals the insulating plate 31, wire ends 22 and 23 and associated elements. The base 32 has slot means 33 formed therein to receive the prongs 28 and 30. The base 32 is detachably secured to the bottom of the shell 10, by means of an upwardly directed screw 34, having screw-threaded engagement within an internally screw-threaded nipple 35, fixedly anchored within a small central opening in the bottom wall 12 and forming a fluid tight joint therewith.

It is to be understood that the form of the invention herewith shown and described is to be taken as a preferred example of the same, and that various changes in the shape, size and arrangement of parts may be resorted to, without departing from the spirit of the invention or the scope of the subjoined claims.

Having thus described my invention, I claim:

1. A liquid heating receptacle comprising a sheet metal body portion including a bottom wall formed to provide a continuous upstanding annular tubular bead upon the bottom wall integral therewith and projecting above the bottom wall, said bead being substantially circularly curved in cross section and including at its lower side a pair of opposed continuous annular shoulders joined to the bottom wall and spaced apart a distance which is considerably less than the inside diameter of said bead, and a substantially rigid circularly formed rod-like heating element arranged within and bodily supported by said bead and being circular in cross section and having its outer surface in direct thermal contact with the interior of said bead about a major portion of its cross sectional circumference and throughout its entire length, said bead being formed around the rod-like heating element from the material of the bottom wall and gripping the heating element and fixedly securing it to the heating receptacle.

2. In a liquid heating receptacle, a sheet metal shell having an integral unitary bottom wall, a circularly curved rigid rod-like electrical heating element, said heating element extending lengthwise thoughout the major portion of a complete circle and being approximately circular in cross section and having an external heat conducting metal sheath, said sheath adapted to withstand high compressive forces without deforming, and a hollow substantially tubular bead drawn from the metal of said bottom wall about said heating element and conforming in cross sectional shape to said heating element and substantially entirely enclosing the heating element and bodily supporting it and being in direct thermal contact with said conducting metal sheath of the heating element, said bead being annular and continuous, there being a slot in said bottom wall afforded by the bead directly under said heating element, said slot being substantially narrower than the diameter of the heating element.

3. A liquid heating receptacle comprising a body portion including a sheet metal bottom wall, a substantially annular rod-like electrical heating element having an internal resistance wire and an external rigid heat conducting sheath, said heating element being substantially circular in cross section, said heating element having spaced apart ends and end wire portions, a hollow continuous annular bead formed from the metal of said bottom wall about said heating element and completely enclosing a major portion of the same and being in direct thermal contact with said external sheath, said bead projecting upwardly from said bottom wall and bodily supporting the heating element near and above the bottom wall, said bead conforming in cross sectional shape to the cross sectional shape of the heating element, said bead having a downwardly opening slot for its full length below said heating element and of a width substantially narrower than the cross sectional diameter of the heating element, and means connected with the end wire portions of the heating element adapted to place them in series in an electrical circuit.

4. A liquid heating receptacle according to claim 3, wherein said end wire portions of the heating element extend through a portion of said slot between said spaced apart ends of the heating element, whereby they may be readily connected with said means.

5. A liquid heating receptacle according to claim 3, wherein said end wire portions of the heating element project from said slot between said spaced apart ends, and a base detachably secured to said body portion and enclosing and concealing said end wire portions and means.

References Cited in the file of this patent

UNITED STATES PATENTS

| 2,687,469 | Koci | Aug. 24, 1954 |

FOREIGN PATENTS

| 366,986 | Great Britain | Feb. 12, 1932 |
| 489,921 | Great Britain | Aug. 5, 1938 |
| 283,740 | Switzerland | Oct. 16, 1952 |